(12) United States Patent
Pattan et al.

(10) Patent No.: US 8,296,384 B2
(45) Date of Patent: Oct. 23, 2012

(54) SYSTEM AND METHOD FOR DEFERRED MESSAGE REMINDERS AND EXPIRY EXTENSION

(75) Inventors: Basavaraj Jayawant Pattan, Bangalore (IN); Mayuresh Madhukar Patil, Bangalore (IN); Kyung-Tak Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 24 days.

(21) Appl. No.: 12/666,196

(22) PCT Filed: Jun. 23, 2008

(86) PCT No.: PCT/KR2008/003566
§ 371 (c)(1),
(2), (4) Date: Dec. 22, 2009

(87) PCT Pub. No.: WO2009/002066
PCT Pub. Date: Dec. 31, 2008

(65) Prior Publication Data
US 2010/0318624 A1 Dec. 16, 2010

(30) Foreign Application Priority Data
Jun. 22, 2007 (IN) ............................ 1302/CHE/2007

(51) Int. Cl.
*G06F 15/16* (2006.01)

(52) U.S. Cl. .................. 709/207; 709/206; 709/219
(58) Field of Classification Search .......... 709/206–207, 709/219, 202–203, 223
See application file for complete search history.

(56) References Cited

U.S. PATENT DOCUMENTS

| | | | |
|---|---|---|---|
| 7,188,073 B1 * | 3/2007 | Tam et al. .................... | 705/7.16 |
| 2004/0152477 A1 | 8/2004 | Wu et al. | |
| 2005/0170861 A1 | 8/2005 | Niemi et al. | |
| 2006/0046758 A1 * | 3/2006 | Emami-Nouri et al. ...... | 455/518 |
| 2007/0070988 A1 * | 3/2007 | Mu ............................... | 370/352 |
| 2007/0203995 A1 * | 8/2007 | Wang et al. .................... | 709/206 |
| 2007/0204022 A1 * | 8/2007 | Hsu et al. ....................... | 709/223 |
| 2008/0005250 A1 * | 1/2008 | Oksum .......................... | 709/206 |

FOREIGN PATENT DOCUMENTS
WO  WO 2009002066 A2  12/2008
* cited by examiner

*Primary Examiner* — Wing Chan
*Assistant Examiner* — Benjamin M Thieu
(74) *Attorney, Agent, or Firm* — The Farrell Law Firm, P.C.

(57) ABSTRACT

Disclosed is a method for transmitting reminders for deferred message, the method includes requesting, by client, to set reminders for deferred messages to a application sever (AS); setting, by the application sever, reminders comprising information of when to remind, whether to repeat reminder or not, and/or how many times to repeat; monitoring, by the application sever, time of the set reminders in order to notify the Client; and notifying, by the application sever, the reminders to the client once a timer triggers to send a notification.

13 Claims, 10 Drawing Sheets

SYSTEM AND METHOD FOR DEFERRED MESSAGE REMINDERS AND EXPIRY EXTENSION

BACKGROUND OF THE INVENTION

1. Field of the Invention

The present invention, in general, is relates various messaging applications developed over Session Initiation Protocol (SIP) like Instant Messaging (IM), Push to talk over Cellular (PoC), Converged IP Messaging (CPM). Particularly this invention relates to those applications where messages arriving for a User are stored temporarily or persistently (e.g., because user is not registered currently, user does not wish to receive the message immediately) by the Service Provider. More particularly the present invention relates to a system and method for deferred message reminders and expiry extension.

2. Description of the Related Art

Currently, when a User is not registered to the Service there can be messages arriving from other Users but cannot be delivered to the recipient User immediately because of reasons like User is not registered to the service. Such messages are temporarily stored by the Server for later delivery and called as Deferred Messages. When the User registers to the Service, depending on User Preferences, User may either get pushed Deferred Messages directly or receive Notification about the arrival of Deferred Message. In the latter case, User may either retrieve the Deferred Messages immediately or can defer it for later retrieval. Depending on the message originator's preferences or the Service Provider policy, Deferred Messages that are temporarily stored on the Server may be deleted by the Server after some period if not retrieved before an expiry time the originator or the Service Provider associated with the Deferred Message. Also the messages may be deleted by the Server without delivering to the User if the Deferred Messages are expired before the User retrieves them. Hence User may lose some Deferred Messages without being delivered to him.

Figure 1:
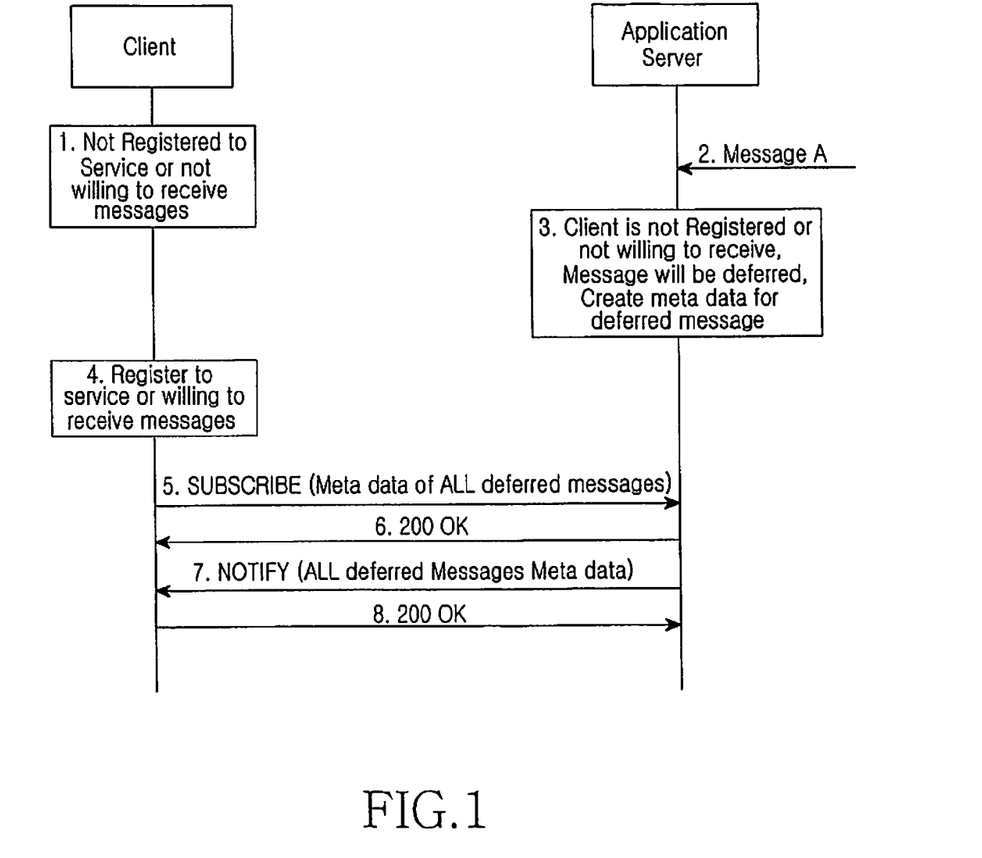
FIG. 1 depicts OMA solution for Deferred Messages with meta data in Application Server (AS)
Figure 2:
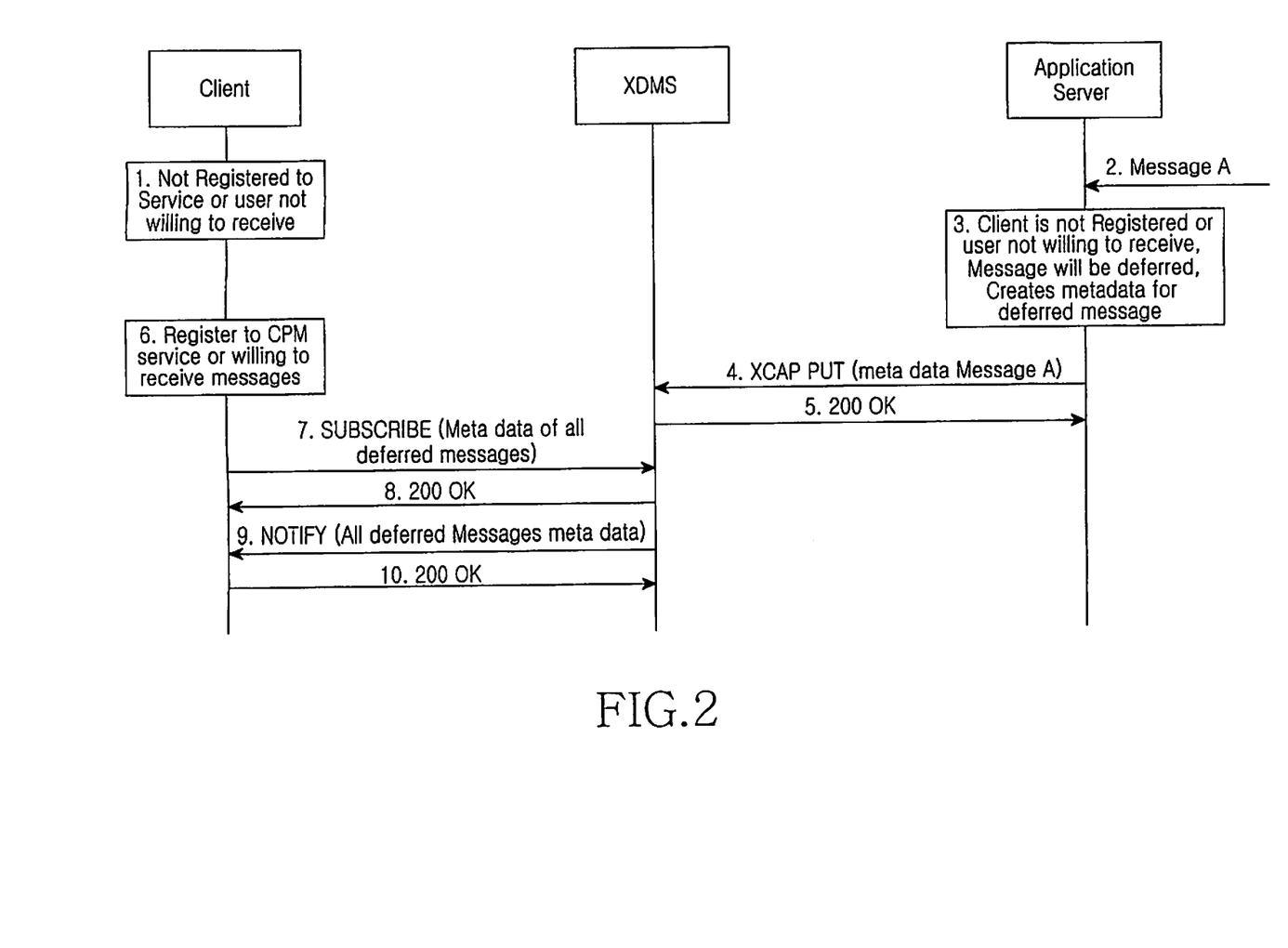
FIG. 2 depicts OMA solution for Deferred Messages with meta data in XDMS.

The mechanism in current art can be better explained with FIG. 1 and FIG. 2.

FIG. 1 depicts OMA (Open Mobile Alliance) developed solution for Deferred Messages where meta data is stored in Application Server (AS) itself along with the Deferred Messages.

1. User not registered to the network or User does not wish to receive messages immediately etc.
2. Message arrives from other Users.
3. When a message arrives at the Application Server to be delivered for an User, it checks if the message has to be temporarily stored because of reasons like User not registered to the network or User does not wish to receive immediately etc. If the message is not for immediate delivery, Application Server creates the meta data for the deferred message and stores in the temporary storage along with the actual message which is to be delivered at a later stage.
4. Assuming User has registered to the network now or is willing to retrieving any deferred message.
5. User Client subscribes to the metadata document to know if there are any messages waiting for retrieval. SIP SUBSCRIBE request is sent to Application Server (where the meta data is stored) to know the messages waiting for retrieval.
6. Application Server acknowledges the receipt of subscribe request.
7. Server then generates single notification containing the meta data of all the messages waiting for retrieval. Client is notified using SIP NOTIFY method. For each Deferred Message, notification contains the meta data in the format as mentioned below:

---

The <history> element in OMA developed IM Application comprises of:
<size> element representing the size of the stored content;
<expiry> element representing the date at which the message expires;
<subject> element representing the Subject header field of the SIP request;
<pager> element containing:
<time-stamp> element representing the creation time of the message;
<from> element taken from the "From" header field of the SIP request;
<to> element taken from the "To" header field of the SIP request always filled if the message is sent to one IM user;
"date" attribute representing the date when the message was sent;
"history-reference" attribute representing the complete path and unique identifier of the actual content of the message;

---

8. Client acknowledges the receipt of the notification.

FIG. 2 depicts OMA developed solution for Deferred Messages where meta data is stored in XML Document Management Server (XDMS) itself along with the Deferred Messages.

1. User not registered to the network or User does not wish to receive messages immediately etc.
2. Message arrives from other Users.
3. When a message arrives at the Application Server to be delivered for an User, it checks if the message has to be temporarily stored because of reasons like User not registered to the network or User does not wish to receive immediately etc. If the message is not for immediate delivery, Application Server creates the meta data for the deferred message.
4. Application Server generated meta data is stored in another entity like XDMS.-XML Configuration Access Protocol (XCAP) PUT method is used to write the meta data information in the document that is present in XDMS. XDMS then updates the meta data into a document.
5. XDMS acknowledges the receipt of XCAP PUT request.
6. Assuming User has registered to the network now or is willing to retrieving any deferred message.
7. User Client subscribes to the metadata document to know if there are any messages waiting for retrieval. SIP SUBSCRIBE request is sent to XDMS (where the meta data is stored) used to know the messages waiting for retrieval.
8. XDMS acknowledges the receipt of subscribe request.
9. XDMS then generates single notification containing the meta data of all the messages waiting for retrieval. Client is notified using SIP NOTIFY method. For each Deferred Message, notification contains the meta data in the format as explained in FIG. 1 Step-7.
10. Client acknowledges the receipt of the notification.

SUMMARY OF THE INVENTION

Accordingly, the present invention aims to provide the system and methods to increase the chances of User retrieving the Deferred Messages and minimizes User losing messages either because of Service Provider policy or message associated expiration.

In accordance with an aspect of exemplary embodiments of the present invention, there is provided a method for transmitting reminders for deferred message, comprising the steps of: requesting, by client, to set reminders for deferred messages to a application sever (AS); setting, by the application sever, reminders comprising information of when to remind, whether to repeat reminder or not, and/or how many times to repeat; monitoring, by the application sever, time of the set reminders in order to notify the Client; and notifying, by the application sever, the reminders to the client once a timer triggers to send a notification.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness.

This invention proposes mechanisms for
1. requesting a reminder and notifying reminders to a user about messages before its expiration,
2. listing of set reminders,
3. updating the set reminders,
4. allowing user to extend the expiry time of
   i. the messages waiting for retrieval
   ii. messages coming in the future from the time of the request.

More specifically the above mentioned mechanisms applicable
   i. to Single, Group or All of messages,
   ii. when the meta data is stored either in Application Server or in XDMS. Invention is explained below for the diagrams included in this document.

Figure 3:
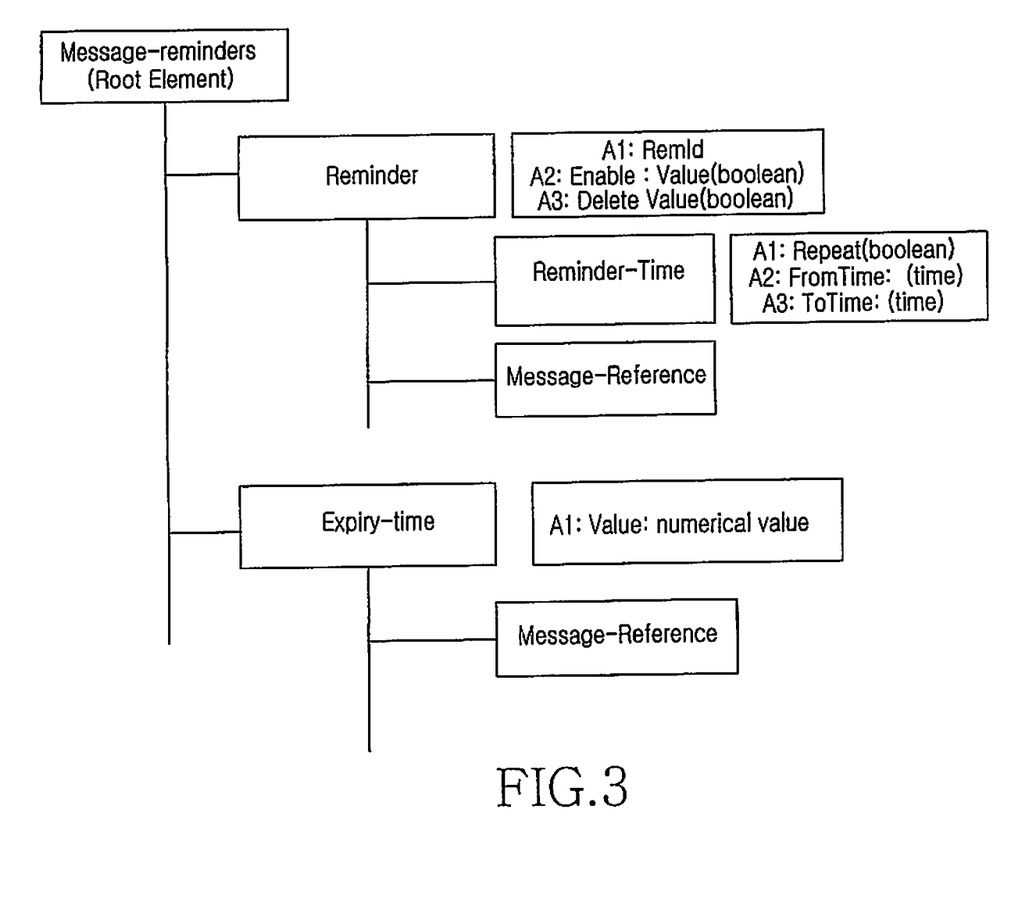
FIG. 3 depicts invention example format "def-mess-rem" for reminder carried in SIP SUBSCRIBE body.

FIG. 3 Example format "def-mess-rem" for reminder carried in SIP SUBSCRIBE body.

Figure 4:
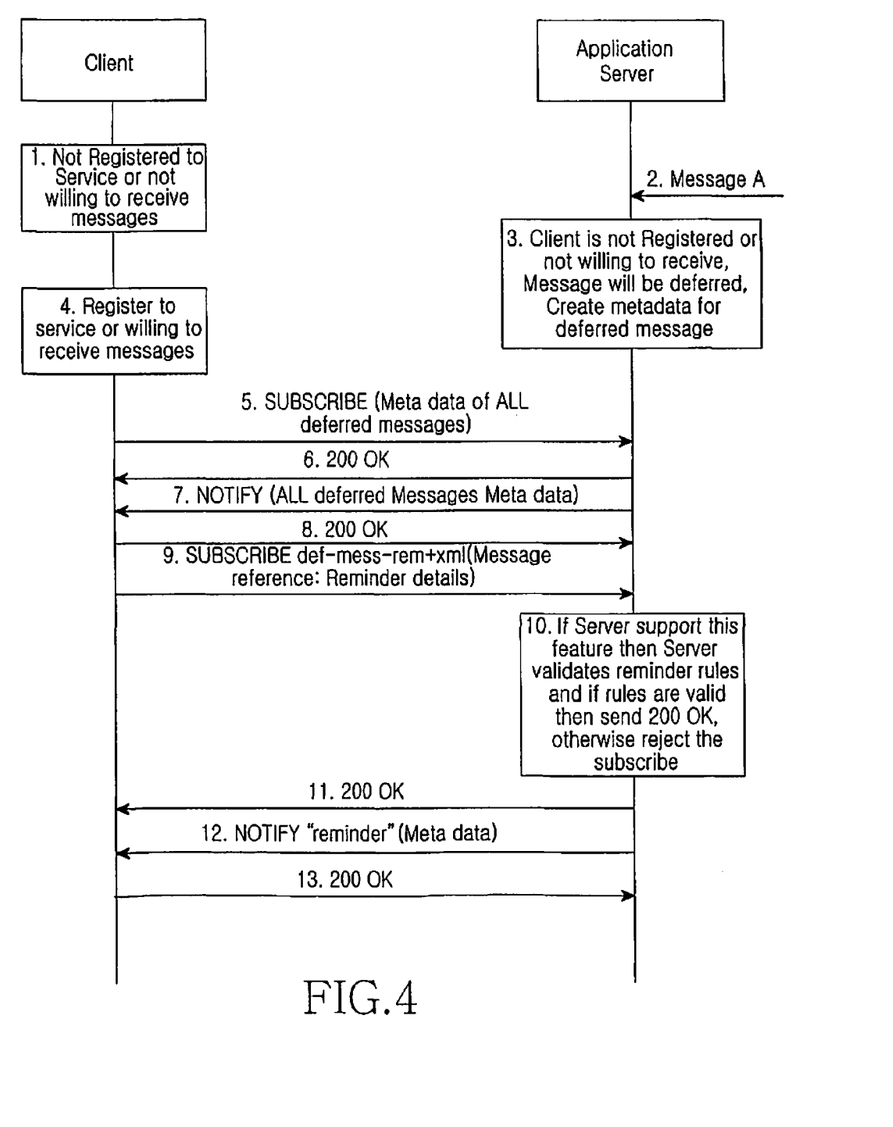
FIG. 4 depicts invention for setting reminders when meta data exists in AS, FIG. 5 depicts invention for setting reminders when meta data exists in XDMS.
Figure 5:
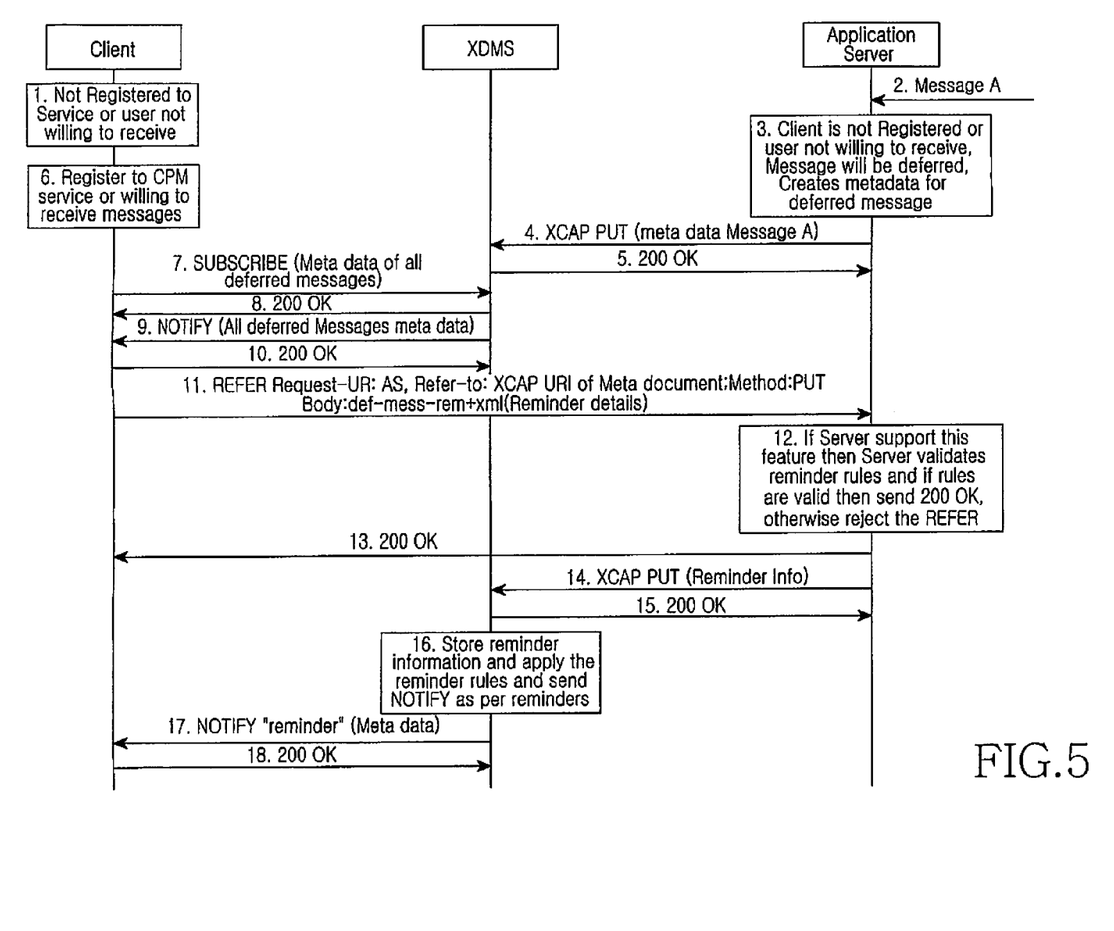

FIG. 3 depicts example format def-mess-rem+xml for reminders carried in the SIP methods mentioned in the FIG. 4 and FIG. 5. FIG. 3 shows a tree structure of xml body of reminders rules carried in these SIP methods. This format has one root element "Message-reminders". The root has two child elements, i) "Reminder", and ii) "Expire". The "Reminder" element will be used for setting the reminders to particular deferred message or to group of deferred messages.

The "Reminder" element has following attributes:
1. RemId: Unique identifier of reminder; It can have any string value,
2. Enable: This is a boolean attribute used to enable or disable the set reminder,
3. Delete: This is a boolean attribute used to delete the set reminder, The "Reminder" element has two child elements i) Reminder-Time, and ii) Message-Reference.

The "Reminder-Time" will be used to specify the time information of reminder i.e., this will tell server when to generate reminders. The "Reminder" will have one boolean attribute "Repeat", which will be used to set periodic reminders. If value of "Repeat" is TRUE then Server will periodically send the reminder based on the time period mentioned in "Reminder-Time" element. The "Reminder-Time" have two more optional attributes "FromTime" and "ToTime". These two attributes will be used for the listing of the already set reminders in Server in specified time period for e.g. List all reminders between 12:00 PM to 1:00 PM time period. The value of "Reminder-Time" can be relative or absolute at UI level but for internal computation purposes the time period is always specified as relative.

The "Message-Reference" element is used to identify the deferred message to which the reminder is set. The value of this element will be any string which identifies the message in deferred message list. This corresponds to "history-reference" attribute representing the complete path and unique identifier of the actual content of the message as explained in FIG. 1 Step-7. Client can include the one or more "Message-Reference" element in the "Reminder" element to set reminder for single deferred message or group of deferred messages.

"def-mess-rem+xml" format also allows client to update (modify, delete, enable/disable) the reminders that are set earlier. For this client can use the "RemId" attribute of "Reminder" element. If client wants to modify the reminder then client will use the "RemId" of that existing reminder and then specifying the changes in "Reminder-Time" element. This allows client to easy update of reminders. If client wants to delete the existing reminder, then "Delete" attribute is set to TRUE. If client wants to enable or disable an existing reminder, then "Enable" attribute is set to TRUE or FALSE respectively.

The "Expire" element is used to request the extension of expiry time of deferred messages. This element has one attribute called "Value" which is used to specify the requested extension of expiry of deferred message. This value can be relative to current expiry time or absolute value mentioning exact date and time. The "Expire" element will have one or more "Message-Reference" element to request for extension of expiry time for single deferred message or group of deferred messages.

FIG. 4 Setting reminders when meta data exists in AS.

Step-1 to Step-8 are same as explained for FIG. 1.

Step-9 User Client requesting to set reminders for deferred messages. Client request is carried in a SIP SUBSCRIBE to AS. SIP SUBSCRIBE body contains the information about
  the duration (when to remind)—in "Reminder-Time" element; and
  whether to repeat reminder or not—in "Repeat" attribute of "Reminder-Time" element.

The duration is validated by the Client before sending the request to the Server. If the requested duration exceeds the expiry time, then Client notifies the User.

Step-10 If reminder is not supported by AS then AS will reject the SIP SUBSCRIBE request with appropriate SIP error code in Step-11. Else the SIP SUBSCRIBE body is validated by AS and stores the reminder.

Step-11 AS acknowledges the Client for SIP SUBSCRIBE request.

Step-12 AS monitors the set reminders in order to notify the Client. Once the timer triggers to send a notification, AS will initiate SIP NOTIFY with the body including the metadata of deferred messages. AS also adds a tag "reminder" in order to distinguish with the normal notify (as indicated in Step-7).

Step-13 Client acknowledges the receipt of notification.

FIG. 5 Setting reminders when meta data exists in XDMS.

Step-1 to Step-10 are same as explained for FIG. 2.

Step-11 User Client requesting to set reminders for deferred messages. Client request is carried in a SIP REFER to AS. SIP REFER body contains the information about the duration (when to remind)—in "Reminder-Time" element; and whether to repeat reminder or not—in "Repeat" attribute of "Reminder-Time" element.

The duration is validated by the Client before sending the request to the Server. If the requested duration exceeds the expiry time, then Client notifies the User.

Refer-To header in SIP REFER request contains XCAP URI of meta data document with "Method" parameter as PUT.

Step-12 If reminder is not supported by AS then AS will reject the SIP REFER request with appropriate SIP error code in Step-13. Else the SIP REFER body is validated by AS and stores the reminder info.

Step-13 AS acknowledges the Client for SIP REFER request.

Step-14 AS will initiate a XCAP PUT request towards XDMS containing reminder information (which is stored as specified in Step-11).

Step-15 XDMS acknowledges XCAP PUT request.

Step-16 XDMS will store the reminder information that is received in XCAP PUT request (Step-14). XDMS monitors the set reminders in order to notify the Client.

Step-17 Once the timer triggers to send a notification, XDMS will initiate SIP NOTIFY with the body including the metadata of deferred messages. XDMS also adds a tag "reminder" in order to distinguish with the normal notify (as indicated in Step-9).

Step-18 Client acknowledges the receipt of notification.

Figure 6:
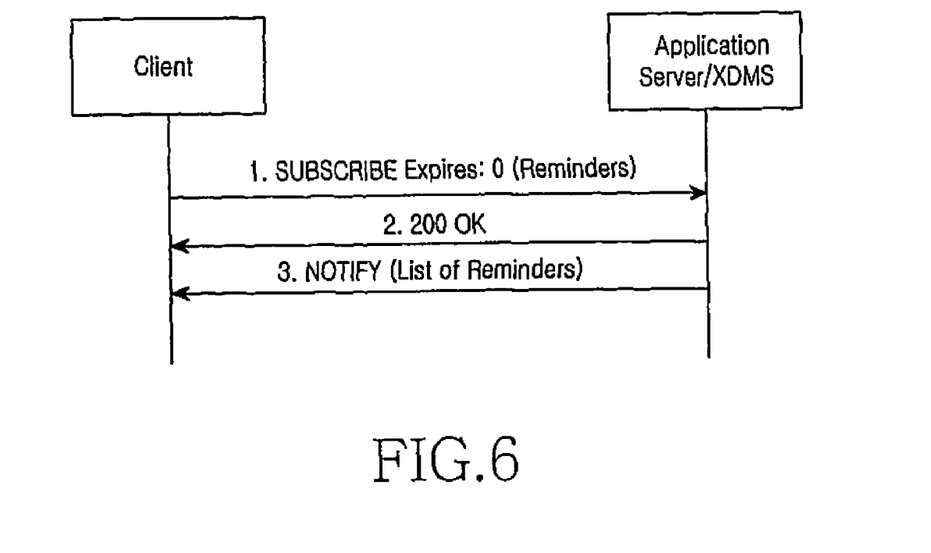
FIG. 6 depicts invention for retrieving the list of set reminders.

FIG. 6 Retrieving the list of set reminders.

Step-1 User Client will initiate a SIP SUBSCRIBE with Expires "0" in order to fetch the existing list of reminders. User can request to show only those reminders which fall within the specified time period using "FromTime" and "ToTime" attributes of "Reminder-Time" element as mentioned in the FIG. 3.

Step-2 Server acknowledges the receipt of SIP SUB-SCRIBE request.

Step-3 The Client will receive the complete list of reminders in the SIP NOTIFY. But the Client can then present the user only those reminders which are within the specified time period or duration.

Figure 7:
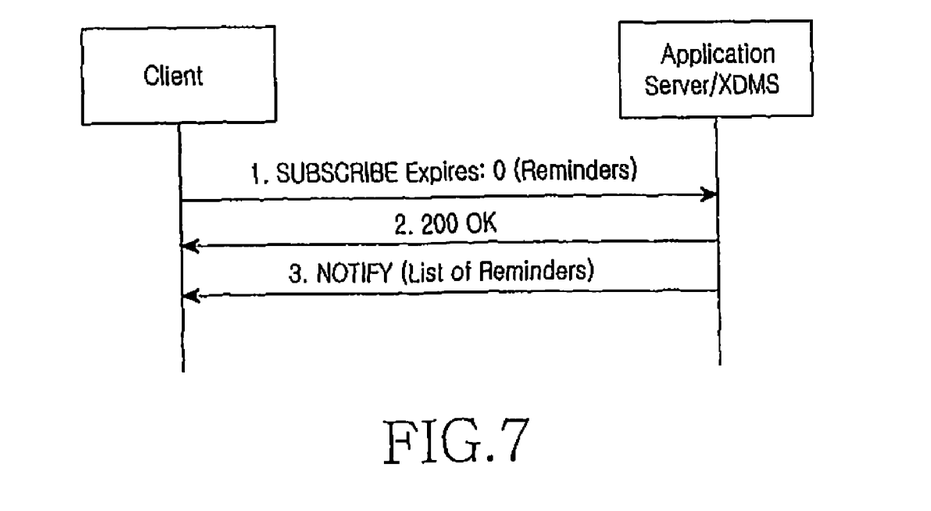
FIG. 7 depicts invention for updating the existing reminders when meta data exists in AS, FIG. 8 depicts invention for updating the existing reminders when meta data exists in XDMS.

FIG. 7 Updating the existing reminders when meta data exists in AS.

Step-1 User Client will initiate a SIP SUBSCRIBE to update existing reminders when the meta data is stored in AS. The SIP SUBSCRIBE body is as explained in FIG. 4 Step-9.

If client wants to modify the reminder then client will use the "RemId" of that existing reminder and then specifying the changes in "Reminder-Time" element. This allows client to easy update of reminders. If client wants to delete the existing reminder, then "Delete" attribute is set to TRUE. If client wants to enable or disable an existing reminder, then "Enable" attribute is set to TRUE or FALSE respectively.

Step-2 Server acknowledges the receipt of SIP SUB-SCRIBE request.

Step-3 The Client will receive the list of updated reminders in SIP NOTIFY body.

Figure 8:
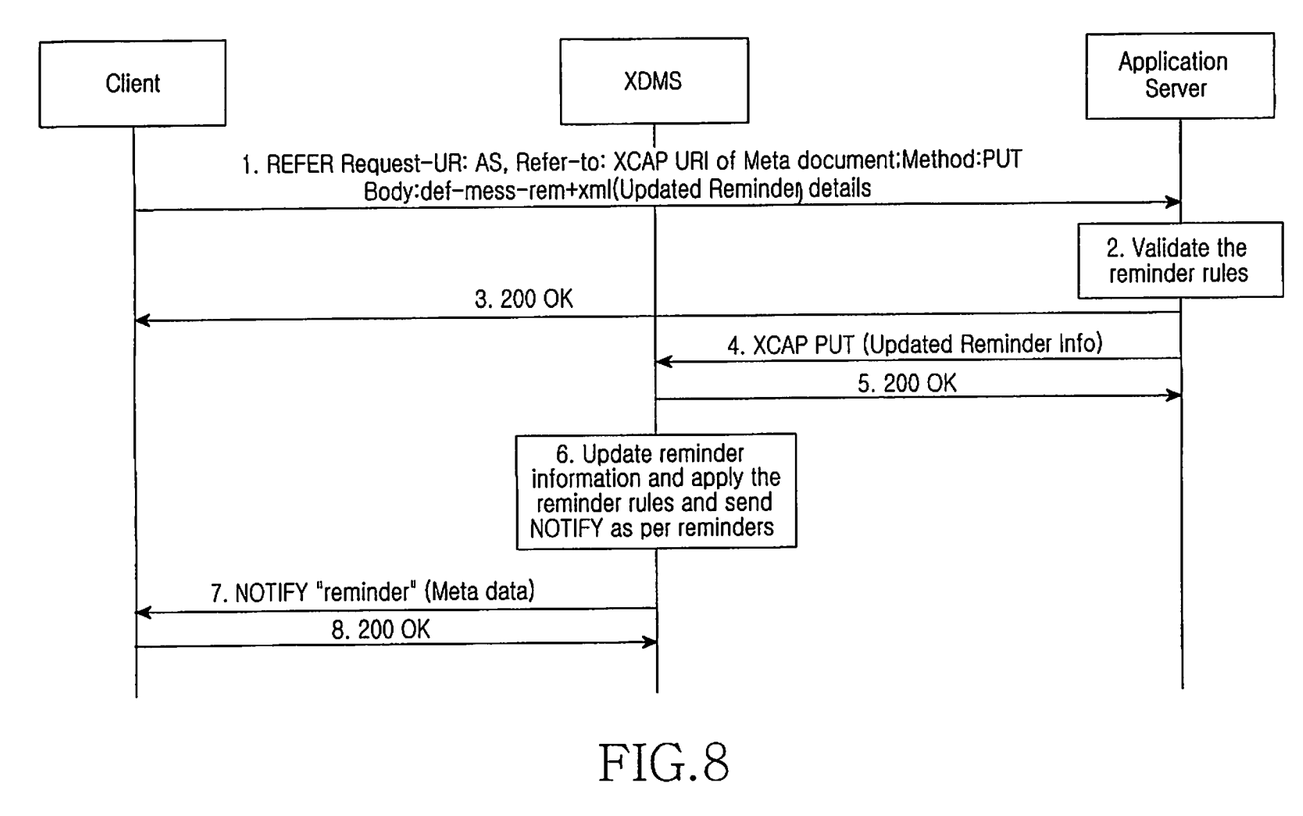

FIG. 8 Updating the existing reminders when meta data exists in XDMS.

Pre-condition: In this example, User has already Subscribed to metadata information of deferred messages as explained in FIG. 5 Step-7.

Step-1 User Client will initiate a SIP REFER to update existing reminders when the meta data is stored in XDMS. The SIP REFER body is as explained in FIG. 5 Step-11. If client wants to modify the reminder then client will use the "RemId" of that existing reminder and then specifying the changes in "Reminder-Time" element. This allows client to easy update of reminders. If client wants to delete the existing reminder, then "Delete" attribute is set to TRUE. If client wants to enable or disable an existing reminder, then "Enable" attribute is set to TRUE or FALSE respectively.

Step-2 SIP REFER body is validated by AS. If invalid AS will return appropriate error code in Step-3 else store updated reminder information.

Step-3 Server acknowledges the receipt of SIP REFER request.

Step-4 AS will initiate a XCAP PUT request towards XDMS containing updated reminder information (which is stored as specified in Step-2).

Step-5 XDMS acknowledges XCAP PUT request.

Step-6 XDMS will update the reminder information that is received in XCAP PUT request (Step-4). XDMS monitors the set reminders in order to notify the Client.

Step-7 Once the tinier triggers to send a notification, XDMS will initiate SIP NOTIFY with the body including the metadata of deferred messages. XDMS also adds a tag "reminder" in order to distinguish with the normal notify.

Step-8 Client acknowledges the receipt of notification.

Figure 9:
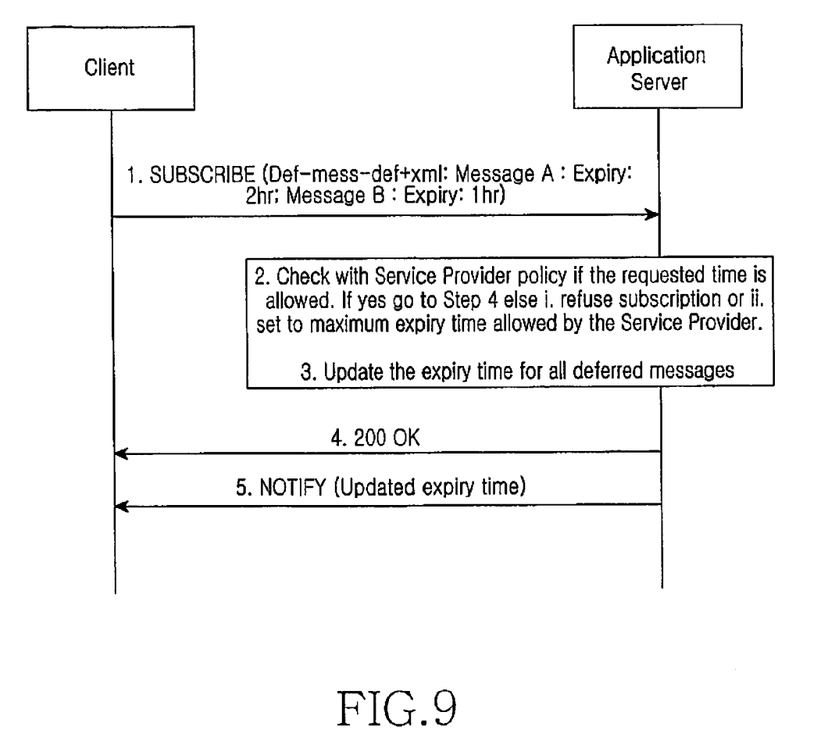
FIG. 9 depicts invention for extension of expiry time for group of deferred messages when meta data exists in AS, FIG. 10 depicts invention for extension of expiry time for group of deferred messages when meta data exists in XDMS.

FIG. 9 Extension of expiry time for group of deferred messages when meta data exists in AS.

Step-1 User Client requesting to extend the expiry time of deferred messages. Client request is carried in a SIP SUB-SCRIBE to AS. SIP SUBSCRIBE body contains the duration information as explained in FIG. 3 duration (how much period to extend expiry)—in "Expire" element.

Step-2 The duration is validated by the AS against the Service Provider policy. If the requested duration is not allowed then, either of the following can happen
  i. refuse the subscription with appropriate error code. Or
  ii. force the value to the maximum expiry time allowed by the service provider.

Step-3 Update the expiry time for all the extension requested messages.

Step-4 AS acknowledges the Client for SIP SUBSCRIBE request.

Step-5 AS will initiate SIP NOTIFY with updated expiry time of deferred messages.

Figure 10:
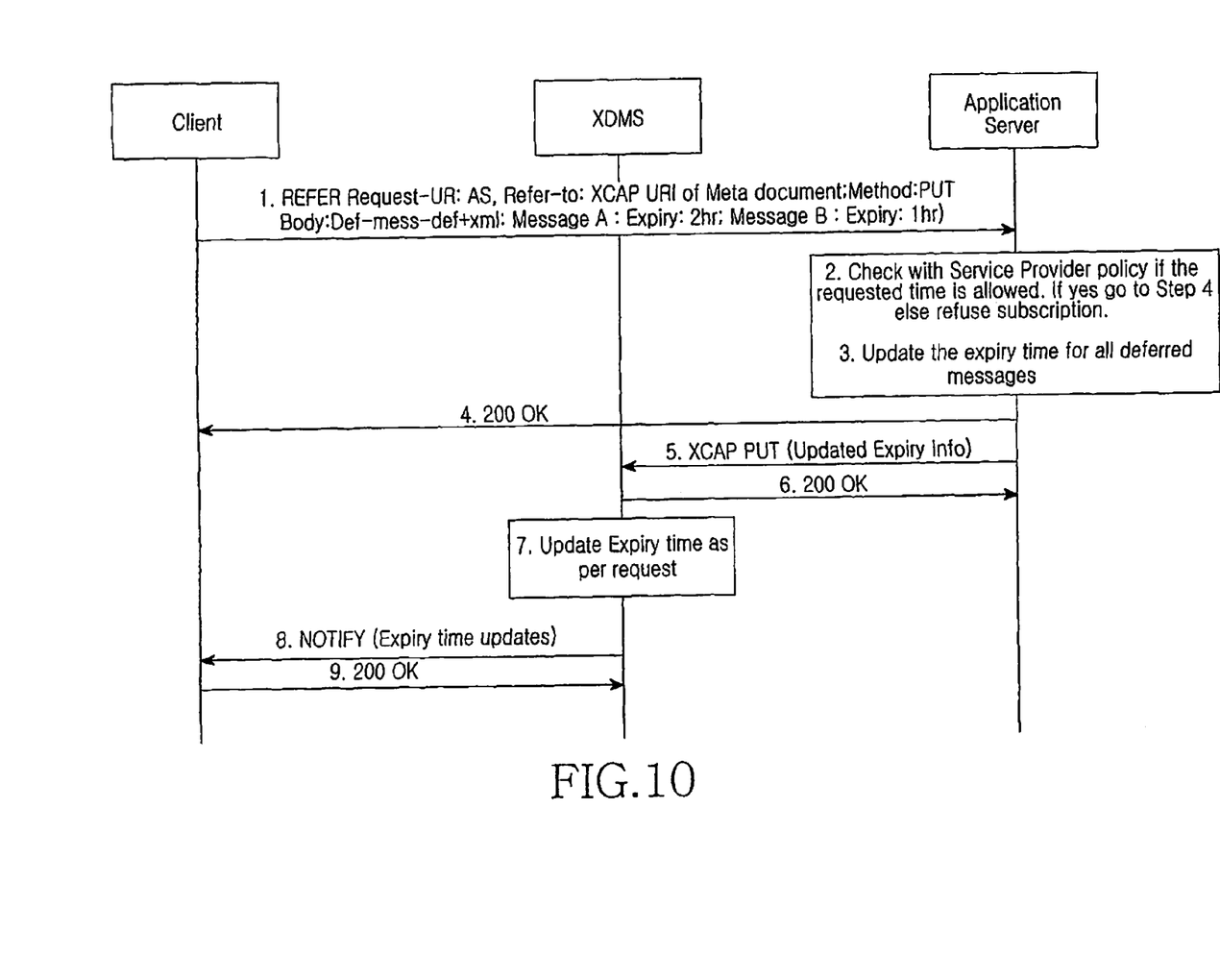

FIG. 10 Extension of expiry time for group of deferred messages when meta data exists in XDMS.

Pre-condition: In this example, User has already Subscribed to metadata information of deferred messages as explained in FIG. 5 Step-7.

Step-1 User Client requesting to extend the expiry time of deferred messages. Client request is carried in a SIP REFER to AS. SIP REFER body contains the duration information as explained in FIG. 3 duration (how much period to extend expiry)—in "Expire" element.

Step-2 The duration is validated by the AS against the Service Provider policy. If the requested duration is not allowed then, either of the following can happen
- i. refuse the SIP REFER request with appropriate error code. Or
- ii. force the value to the maximum expiry time allowed by the service provider.

Step-3 Update the expiry time for all deferred messages.

Step-4 AS acknowledges the Client for SIP REFER request.

Step-5 AS will initiate a XCAP PUT request towards XDMS containing the extension expiry information.

Step-6 XDMS acknowledges XCAP PUT request.

Step-7 Update the expiry time for all the extension requested messages.

Step-8 AS will initiate SIP NOTIFY with updated expiry time of deferred messages.

Step-9 Client acknowledges the receipt of notification.

Figure 11:
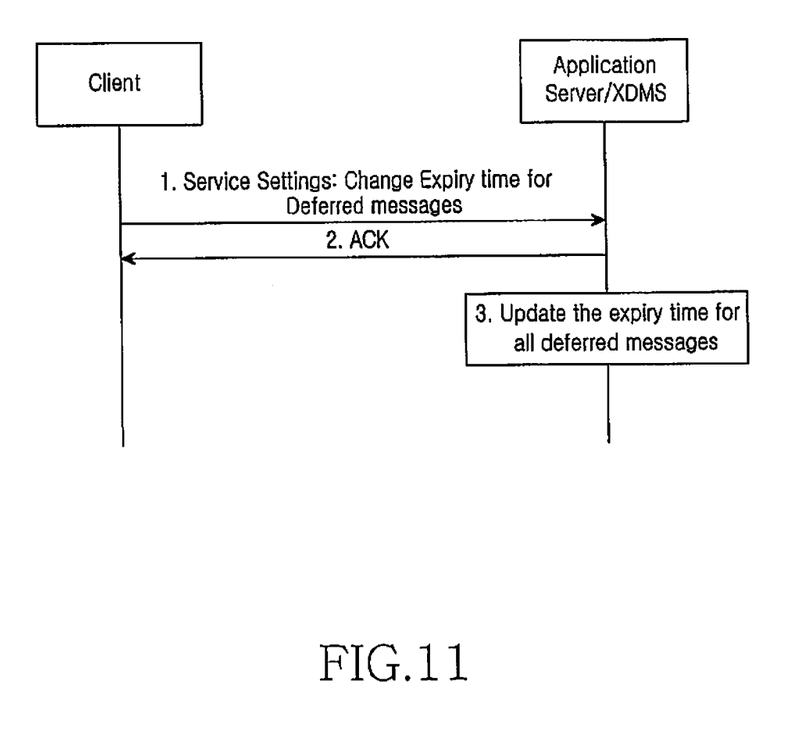
FIG. 11 depicts invention for extension of expiry time for all waiting to retrieve or future deferred messages.

FIG. 11 Extension of expiry time for all waiting to retrieve or future deferred messages.

This invention proposes to have a Service Setting or User Preferences for extending the expiry time of deferred messages. The Service Setting or User Preferences may be stored either in AS or in XDMS. When the Service Settings or User Preferences are stored in AS, SIP PUBLISH method may be used to indicate user selected values to the Server. And when the Service Settings or User Preferences are stored in XDMS, XCAP PUT method may be used to indicate user selected values to the Server.

Step-1 When a User wants to extend the expiry time of all the messages waiting to be retrieved and for future messages which may be deferred, the Client can initiate updating of Service Settings or User Preferences. Updating the Service Settings or User Preferences can use SIP PUBLISH or XCAP PUT method or other methods depending whether the Service Settings or User Preferences are stored in AS or XDMS respectively. If Server does not accept the requested expiry time, it will return an appropriate error code to the Client. The error code can indicate the maximum value allowed by the Service Provider.

Step-2 Server acknowledges the receipt of service setting request.

Step-3 When a new message arrives and has to be deferred, AS checks the Service Settings or User Preferences (stored in AS or XDMS) that are set as explained in Step-1 above and applies the expiry time found there to the deferred message meta data document.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a reminder for a deferred message, the method comprising the steps of:

receiving a reminder requesting message for requesting setting of a reminder for the deferred message from a client;

setting a reminder corresponding to reminder information including time information for indicating when to remind, repeat information for indicating whether to repeat the reminder or not, and repeat count information for indicating how many times to repeat;

monitoring time of the set reminder in order to notify the client; and notifying the client of the reminders once a timer triggers to send a notification, wherein the reminder requesting message includes a Message-Reference element to identify the deferred message to which the reminder is set, including a history-reference attribute representing a path and unique identifier of the deferred message, wherein receiving the reminder includes a SIP REFER message for requesting to store reminder information in an XML Document Management Server (XDMS) by an XML Configuration Access Protocol (XCAP) PUT method, and wherein setting the reminder includes requesting, by an application server to the XDMS, for storing the reminder information and for transmitting a SIP NOTIFY message including metadata of the deferred message corresponding the reminder information to the client.

2. The method as claimed in claim 1, wherein receiving the reminder includes receiving a SIP SUBSCRIBE message including the reminder requesting message.

3. The method as claimed in claim 1, wherein notifying the client includes transmitting the SIP NOTIFY message including the metadata of the deferred message to the client.

4. The method as claimed in claim 3, wherein the SIP NOTIFY message includes a reminder tag for distinguishing with a normal notify.

5. The method as claimed in claim 1, further comprising receiving a SIP SUBSCRIBE message including update information for requesting update of the reminder information.

6. The method as claimed in claim 1, further comprising:
receiving the SIP REFER message including update information for requesting update of the reminder information; and
requesting update of the reminder information to the XDMS.

7. The method as claimed in claim 1, further comprising:
receiving a SIP SUBSCRIBE message including information for requesting extending an expiry time of the deferred message from the client;
determining whether extending the expiry time of the deferred message is allowed;
updating the expiry time of the deferred message, when extending the expiry time of the deferred message is allowed; and
transmitting the SIP NOTIFY message including the updated expiry time of the deferred message corresponding the reminder information to the client.

8. The method as claimed in claim 7, further comprising transmitting a response message including information for rejecting extending the expiry time of the deferred message, when extending the expiry time of the deferred message is not allowed.

9. The method as claimed in claim 1, further comprising:
receiving the SIP REFER message including information for requesting extending an expiry time of the deferred message from the client;

determining whether extending the expiry time of the deferred message is allowed; and transmitting a message requesting update of the expiry time of the deferred message to the XDMS, when extending the expiry time of the deferred message is allowed.

10. The method as claimed in claim 9, further comprising transmitting a response message including information for rejecting extending an expiry time of the deferred message to the client, when extending the expiry time of the deferred message is not allowed.

11. A method for transmitting a reminder for a deferred message, the method comprising the steps of:

transmitting a reminder requesting message for requesting setting of a reminder of the deferred message to an application server, wherein the reminder requesting message includes reminder information including time information for indicating when to remind, repeat information for indicating whether to repeat the reminder or not, and repeat count information for indicating how many times to repeat; and receiving a reminder message including metadata of the deferred message according to the time information, wherein the reminder requesting message includes a Message-Reference element to identify the deferred message to which the reminder is set, including a history-reference attribute representing a path and unique identifier of the deferred message, wherein transmitting the reminder includes transmitting a SIP REFER message for requesting storing of the reminder requesting message and the reminder information in an XML Document Management Server (XDMS) by an XML Configuration Access Protocol (XCAP) PUT method, and wherein receiving the reminder includes receiving a SIP NOTIFY message including the metadata of the deferred message corresponding reminder information from the XDMS.

12. The method as claimed in claim 11, wherein transmitting the reminder includes transmitting a SIP SUBSCRIBE message including the reminder requesting message.

13. The method as claimed in claim 12, wherein receiving the reminder includes receiving the reminder message including the metadata of the deferred message from the application server.

* * * * *